United States Patent [19]

Haley

[11] Patent Number: 4,522,086
[45] Date of Patent: Jun. 11, 1985

[54] CONTROL SYSTEM FOR CONTINUOUSLY VARIABLE TRANSMISSION

[75] Inventor: William J. Haley, Sterling Heights, Mich.

[73] Assignee: Borg-Warner Corporation, Chicago, Ill.

[21] Appl. No.: 257,035

[22] Filed: Apr. 24, 1981

[51] Int. Cl.³ .................... B60K 41/12; B60K 41/14
[52] U.S. Cl. ............................ 74/867; 74/862; 74/864; 74/870; 474/18
[58] Field of Search ............... 74/861, 862, 864, 865, 74/867, 868, 870; 474/18, 28

[56] References Cited

U.S. PATENT DOCUMENTS

| | | | |
|---|---|---|---|
| 3,115,049 | 12/1963 | Moan | 74/868 |
| 3,200,666 | 8/1965 | Schrodt et al. | 474/28 |
| 3,600,961 | 8/1971 | Rattunde | 74/867 |
| 3,714,836 | 2/1973 | Pierce, Jr. et al. | 74/864 |
| 3,768,339 | 10/1973 | Kolehmainen et al. | 74/864 |
| 4,152,947 | 5/1979 | van Deursen et al. | 474/28 |
| 4,161,894 | 7/1979 | Giacosa | 474/28 |
| 4,476,746 | 10/1984 | Mike | 74/867 |

FOREIGN PATENT DOCUMENTS 1119621 12/1961 Fed. Rep. of Germany ........ 74/867
2075620 11/1981 United Kingdom .................. 74/867

Primary Examiner—Leslie A. Braun
Assistant Examiner—D. Wright
Attorney, Agent, or Firm—James J. Jennings

[57] ABSTRACT

The disclosed control system for a CVT controls the line pressure which is applied to the secondary pulley to maintain adequate belt tension, at a level significantly lower than previously was produced. An improved throttle valve is provided, and used in this throttle-sensitive regulation of line pressure. An improved ratio valve is provided, which combines spring and fluid forces in a manner to produce the ratio-indicating fluid signal, with negligible loading on the movable sheave where the ratio change is sensed. In the ratio-changing portion of the system, the combination of a timing valve and accumulator valve cooperate in demand type downshifts to provide adequate time for oil flow into the secondary pulley chamber as the primary pulley chamber is exhausted, to keep adequate belt tension during such a downshift.

9 Claims, 3 Drawing Figures

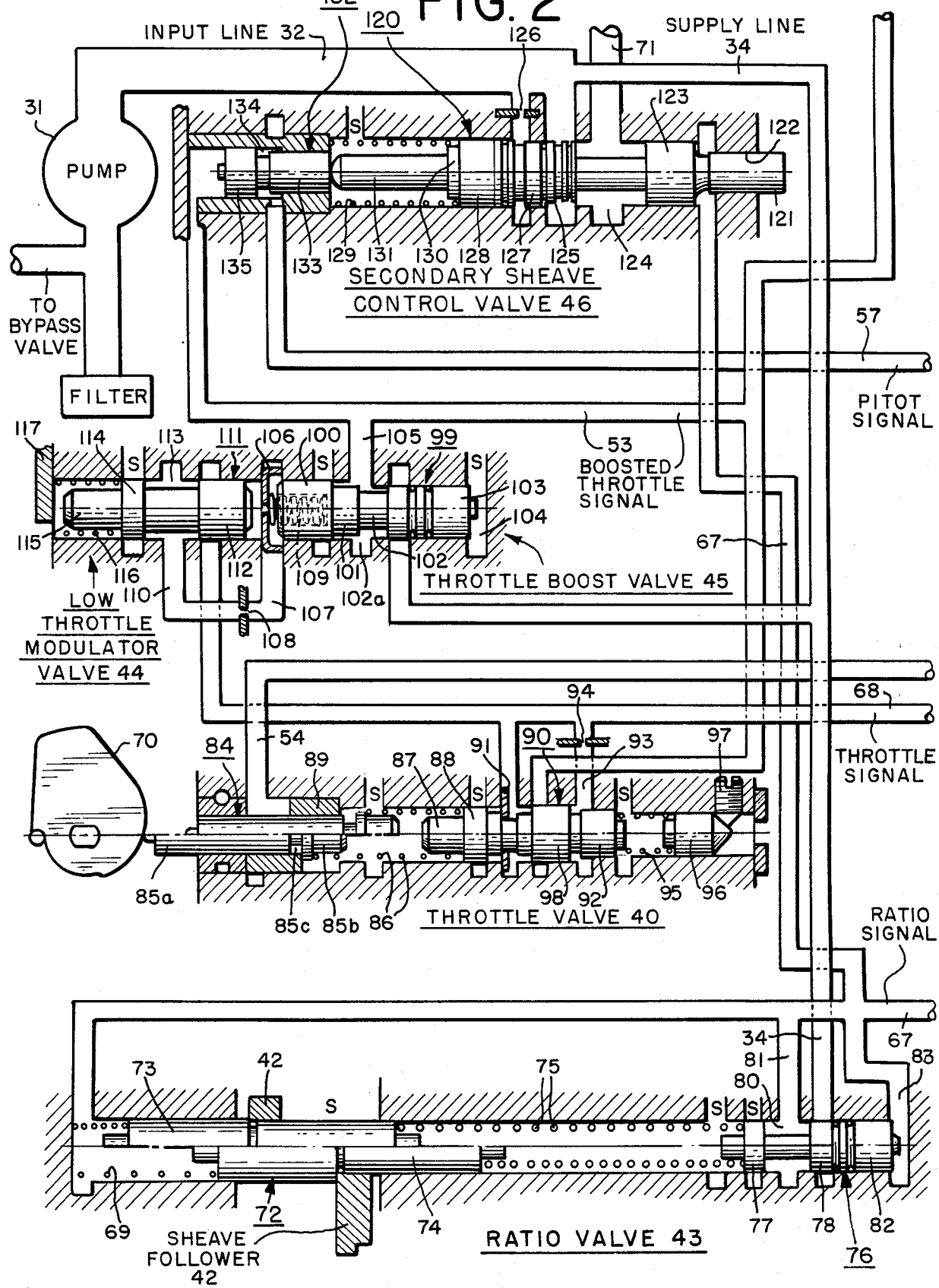

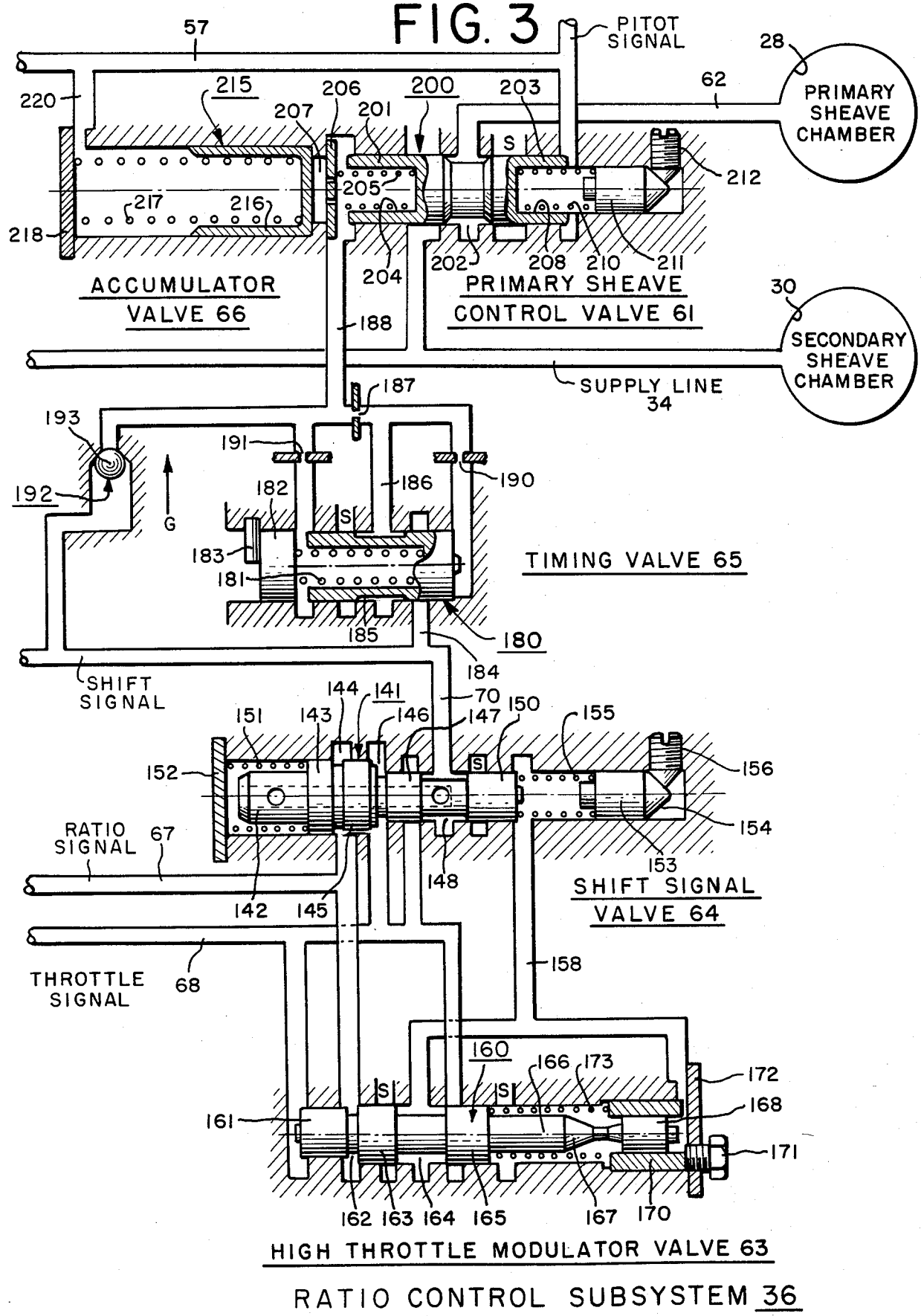

CONTROL SYSTEM FOR CONTINUOUSLY VARIABLE TRANSMISSION

BACKGROUND OF THE INVENTION

For some decades a continuously variable transmission (CVT) has been used, generally in an experimental sense, to provide a continuously variable drive ratio between an engine and a load. The CVT has been successfully tested in an automotive vehicle, to provide an appropriate ratio between the engine and the rear wheels, rather than being limited by discrete step changes of ratio of the type provided by conventional gear trains. Various types of control systems for CVT's have been developed and implemented.

One example of such a control system is described in U.S. Pat. No. 4,152,947, which issued May 8, 1979. This patent discloses the use of one valve to control the belt tension between the adjustable pulleys, and a second valve to regulate the effective pulley diameters, thus to control the transmission ratio. Like other control systems developed for CVT's, the identified system suffers from various shortcomings. Among these are the production of a line pressure higher than required when the system is operating at normal load speeds with low torque demand. In addition the disclosed follower system for translating movement of one adjustable sheave into a fluid signal imposes a load on that sheave greater than desired. Another area needing improvement is the operation of the system ratio control valve.

It is thus a primary consideration of the present invention to provide an improved control system for a CVT, with a line pressure substantially lower than that provided in earlier systems when the operating conditions permit. A corollary consideration is the production of an improved throttle valve and associated components to achieve this lower line pressure in the system.

Another significant consideration is the provision of such a system with an improved ratio valve, that is, the valve which senses the position of one movable sheave and provides a fluid signal which varies as a function of transmission ratio.

An important consideration is the provision of a control system with significantly improved operation of the ratio control arrangement.

SUMMARY OF THE INVENTION

A control system constructed in accordance with the present invention is useful with a continuously variable transmission having primary and secondary pulleys. Each pulley has a first, axially fixed sheave and a second sheave axially movable relative to the first sheave, and a belt intercouples the pulleys. The control system receives input signals from a torque demand indicator (such as a "gas" pedal or a throttle plate), and a position indicator which provides an indication of the position of one of the movable sheaves. The control system includes a supply line and a pump for establishing fluid flow in the supply line. A sheave follower is connected to abut the movable sheave, functioning as the position indicator from which the position indication is to be derived. A ratio valve is connected to receive position indication information from the sheave follower and to provide a ratio-indicating signal. A secondary sheave control valve is connected to regulate the pressure in the supply line, thus regulating the pressure supplied to the secondary pulley movable sheave. A primary sheave control valve is connected to the supply line and regulates the pressure of the fluid passed to the primary pulley movable sheave, to regulate the position of the primary pulley movable sheave and thus control the drive ratio between the pulleys.

In accordance with an important aspect of the invention, an improved throttle valve is provided and coupled to the secondary sheave control valve, and operates to provide a relatively low (compared to earlier systems) line pressure when operating at reduced torque demand.

In accordance with another aspect of the invention, an improved ratio valve is provided which combines fluid and spring forces to produce fluid pressure signal as a function of ratio, with negligible loading on the movable sheave.

In accordance with another aspect of the invention, a timing valve and accumulator valve are provided and coupled to the primary sheave control valve in a manner to improve the ratio control system construction.

THE DRAWINGS

In the several figures of the drawings, like reference numerals identify like elements, and in those drawings;

FIG. 1 is a block diagram of a control system constructed in accordance with the invention; and FIGS. 2 and 3 are schematic diagrams which, taken together, illustrate details of the system shown more generally in FIG. 1.

GENERAL SYSTEM DESCRIPTION

The control system shown in FIG. 1 fulfills three main functional requirements. The first is to produce the pressure that is used to apply the hydraulic friction elements (such as the brake and clutch). This pressure must be adequate to hold the input torque, while being consistent with good "garage" shift quality. The second requirement is to produce the pressure that supplies the secondary sheave chamber, to control the belt clamping force and thus the belt torque capacity. This pressure level is the highest pressure in the system and, therefore, for best efficiency it must be kept as low as possible consistent with adequate safety margins. The third main requirement is to have a system that controls the belt ratio-changing in a desired sequence of speeds and carburetor opening.

FIG. 1 depicts control system 10 of this invention in a block format, and also shows continuously variable transmission (CVT) 11 in a simplified arrangement. The CVT has a primary pulley 12 and a secondary pulley 13. Primary pulley 12 includes a first sheave 14 which is axially fixed, and a second or movable sheave 15 which is displaceable relative to sheave 14. Secondary pulley 13 includes an axially fixed sheave 16, and a second sheave 17 which is axially movable relative to sheave 16. The pulleys are intercoupled by a belt 18. Mechanical drive for the CVT is provided from an engine 20 which has an output shaft 21 coupled to the input member or impeller 22 of a hydrodynamic coupling 23. As shown, this is a simple fluid coupling with an output member or turbine 24, and a lockup clutch 25 is provided to effectively lock engine output shaft 21 to turbine 24 when the clutch is engaged. Output member 24 of the fluid coupling is coupled to input shaft 26 of the CVT, which is in turn connected to axially fixed sheave 14 of the primary pulley. Omitted from the drawing is a standard-reverse-neutral gear selector arrangement, which is positioned between fluid coupling 23 and primary pulley 12. Secondary pulley 13 has its fixed sheave 16 connected to output shaft 27, which can in turn be coupled to additional reduction means and/or final drive means (not shown) in a well-known manner. Those skilled in the art will appreciate the details of the mechanical units from the engine 20 through CVT output shaft 27 are now well-known, and illustrated in various patents such as that cited in the introduction above. For purposes of this explanation it is sufficient that a chamber 28 is defined adjacent movable sheave 15 in the primary pulley, for receiving fluid under pressure to effect movement of sheave 15 toward axially fixed sheave 14. A similar chamber 30 is provided in sheave structure 17 of the secondary pulley to regulate movement of sheave 17 in an axial sense with respect to fixed sheave 16.

In general, the fluid under pressure for actuating the movable sheaves and the other components of the system is provided by a pump 31, driven from engine 20 or another suitable source of energy. Pump 31 provides a pressure which is regulated over the junction denoted 33, to produce a regulated pressure level in supply line 34. This regulated pressure is supplied to chamber 30 in secondary pulley structure 13, and is used to maintain sufficient tension on the belt to prevent slipping of belt 18 as it transfers torque between the pulleys. This fluid pressure level is regulated by the belt tension control subsystem 35 shown at the left side of the drawing.

The pressure in chamber 28 of primary pulley movable sheave 15 is regulated by ratio control subsystem 36 shown in the right portion of the drawing. In general, this subsystem modifies the pressure in supply line 34 in accordance with the CVT ratio, input speed, and torque demand (or throttle position). The torque demand signal is provided by a pedal designated 37, and this signal is translated over a linkage represented by broken line 38 to a throttle valve 40 in the belt tension control subsystem 35. Another input to this subsystem is represented by broken line 41, which represents mechanical contact between movable sheave 15 of the primary pulley and a sheave follower 42 associated with ratio valve 43 in the tension control subsystem 35. This subsystem also includes a low throttle modulator valve 44 and a throttle boost valve 45, which cooperate with throttle valve 40 and ratio valve 43 in providing information to secondary sheave control valve 46. It will become apparent that valve 46 functions, in accordance with an important aspect of this invention, to reduce the pressure in supply line 34 when the vehicle is running at a low or normal speed and has low torque demand, but still maintains a pressure in supply line 34 sufficient to prevent belt slippage and supply the brake and clutch elements. The output connection from valve 46 is shown at point 33, and it is the operation of this valve which effects pressure regulation of the fluid provided from pump 31, so that the pressure in supply line 34 which holds the pulley system and prevents belt slippage is a well regulated, but not excessively high, pressure level.

A standard manual valve 47 receives an input signal from manual selector 48 over a linkage represented by broken line 50. Valve 47 provides fluid through line 51 to actuate the reverse brake (not shown) or through line 52 to actuate the forward clutch (not shown). Such brake and clutch arrangements are well-known in this art, and no further description will be given herein. Manual valve 47 receives a fluid pressure signal over line 53 from throttle boost valve 45. A "manual low" fluid signal is provided by valve 47 in line 54 to throttle valve 40 when the drive mode selector is displaced to the appropriate position.

A lockup control valve 55 is provided to pass a signal over line 56 to actuate lockup clutch 25 when valve 55 is operated. This valve receives input signals over line 53 from throttle boost valve 45, over line 57 from pitot tube 58, and over line 70 from ratio control subsystem 36. Pitot tube 58 provides a fluid signal in line 57 which varies as a function of the speed of primary pulley 12, and thus is a measure of the speed of input shaft 26 for the transmission. This pressure signal is more accurately a function of the square of the primary sheave speed, and is located at the outer diameter of the primary sheave housing. The structure of the pitot tube and lockup control valve is generally conventional and will not be set out in greater detail.

Ratio control subsystem 36 includes a primary sheave control valve 61, connected to receive fluid under pressure from supply line 34 and is controlled by a pitot signal over line 57 and a signal in line 188 (FIG. 3) to provide a regulated pressure in line 62 (FIG. 1) to chamber 28 in the primary pulley, to control the movement of sheave 15. In accordance with general practice in this art, the effective face area within chamber 28 is made approximately double that of the piston area in chamber 30, so that the primary pulley can "overpower" the secondary pulley and effect a ratio change of the transmission. Other components of subsystem 36 include a high throttle modulator valve 63, a shift signal valve 64, a timing valve 65, and an accumulator valve 66 which also receives an input signal from pitot tube 58. A ratio-indicating pressure signal is provided over line 67 by ratio valve 43, and is received by both shift signal valve 64 and high throttle modulator valve 63. Both these valves 63, 64 also receive a throttle position signal over line 68 from throttle valve 40 in the belt tension control subsystem. With this general perspective of the system layout, a detailed description of the invention will now be given.

DETAILED DESCRIPTION OF THE INVENTION

Belt Tension Control Subsystem: Structure

Figure 1:
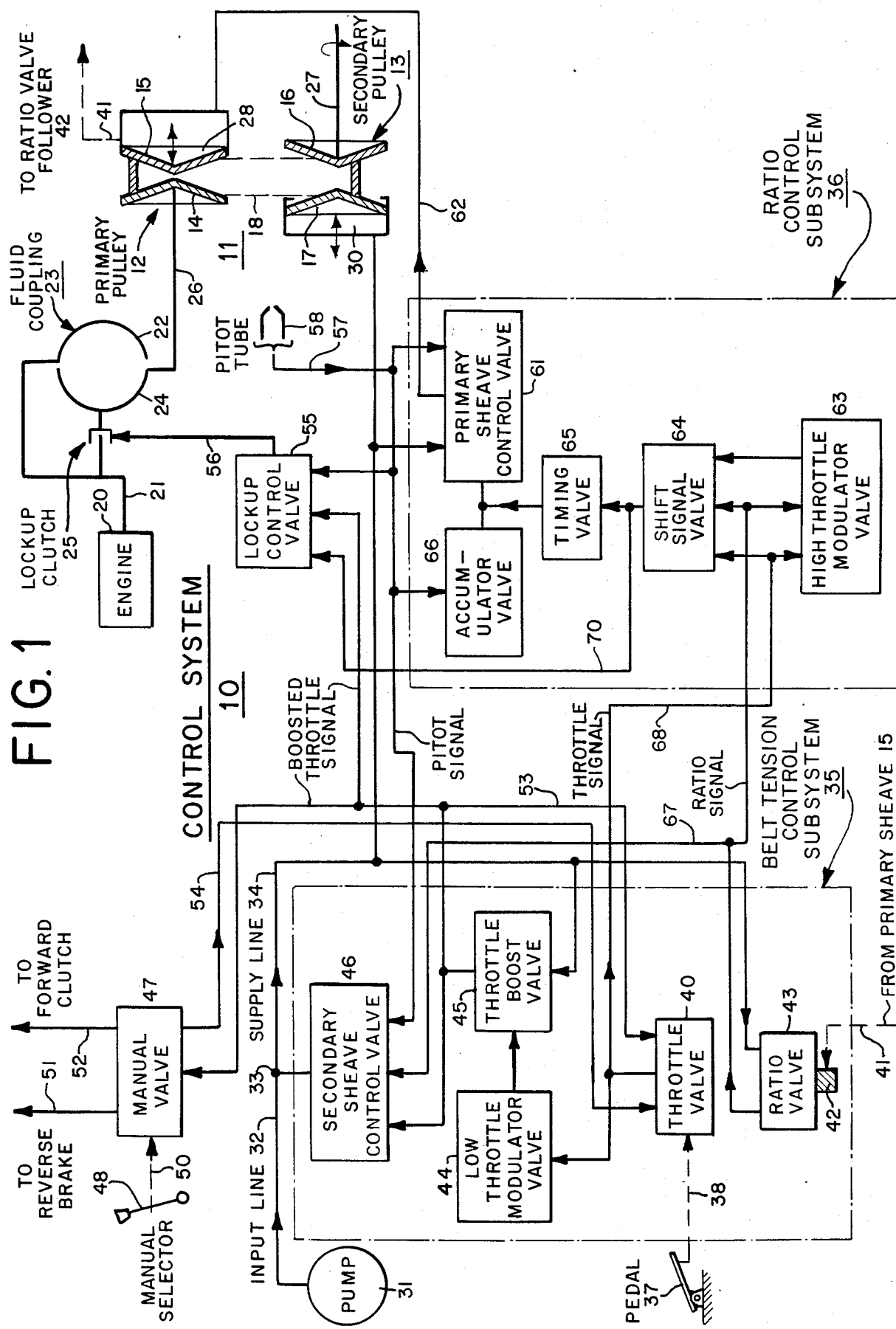

The valves and circuits to be described in connection with FIG. 2 develop the throttle and ratio signals, and regulate the pressure in supply line 34. In addition to the signals already described, throttle boost valve 45 develops a "boosted throttle pressure" signal in line 53, which is passed to throttle valve 40, and is also passed to manual valve 47 and lockup control valve 55 in FIG. 1. Secondary sheave control valve 46 provides fluid through line 71 for various lubrication needs, in addition to the pitot tube mechanism and the transmission oil cooler. These connections are not shown as they are well-known in this art.

Considering first the structure of the several valves depicted, ratio valve 43 basically receives an input mechanical signal through sheave follower 42, denoting the instantaneous position of primary pulley movable sheave 15, and provides an output signal in line 67. This signal is proportional to the ratio between the pulleys and thus the ratio of the transmission.

The components in the left portion of ratio valve 43 are divided and depicted in both the low ratio and the overdrive ratio positions. The low ratio is shown in the upper half of the valve, and the overdrive ratio is depicted in the lower half. Valve 43 includes a first spool 72, which includes a land 73 at its left end, and a land 74, reduced in diameter from that of land 73, at its right end. An outer spring 69 is supported between the end wall of the valve and the face of land 73. Sheave follower 42 has a short flange extending into the groove between lands 73, 74, so that the sheave follower moves spool 72 as the pulley ratio changes. A second or inner spring 75 is positioned between spool 72 and a conventional regulator valve spool 76. Spool 76 is a standard modulator valve of a type well-known and understood in this art. This spool has a pair of lands 77, 78 on each side of a central groove 80, which communicates through a short line 81 with ratio signal line 67. Another land 82 extends partially into a short channel 83, which communicates with main ratio signal line 67.

Throttle valve 40 receives its source pressure through line 53 from throttle boost valve 45, and operates to provide a controlled pressure in line 68 to represent the throttle signal. At the left side of the throttle valve is a first spool 84, having lands 85a and 85b on either side of a groove 85c. Cam 70 bears against land 85a, and a spring 86 is positioned between spool 84 and another spool 90. Spool 90 includes a stem 87 adjacent land 88, and lands 98 and 92. Spool 90 and its associated bore and channels form a standard type modulator valve. The groove between lands 98, 92 is adjacent a short channel 93 which provides communication, through an orifice 94, with throttle signal line 68. This feedback path (through orifice 94 and channel 93) adds to the net pressure exerted at the right end of spool 90 by another spring 95 positioned between the right end of spool 90 and the left end of an adjust device 96, the position of which can be varied by adjustment of set screw 97 in a well-known manner.

As will be seen hereinafter, the signal produced by throttle valve 40 in line 68 is generally a function of the throttle opening, or torque demand, represented by the position of cam 70. This signal is passed to the ratio control subsystem as shown in FIGS. 1 and 3, and is also passed upwardly to low throttle modulator valve 44. Spool 111 of the low throttle modulator valve has a land 112, a groove 113 which communicates with channel 110, another land 114 which normally blocks channel 110 from sump, and a stem portion 115 at the left end. The function of low throttle modulator valve 44 is to provide a linear increase in the throttle pressure received in channel 68, and pass this signal through line 110, orifice 108 and channel 107 to augment the pressure of spring 109 bearing on spool 99, up to a certain pressure level. This level is determined by spring 116, positioned between valve stop 117 and land 114 of spool 111. Valve 44 does not move at all, but stays in its far right position as the throttle pressure in line 68 rises to about 30 psi. This pressure denotes a throttle opening of 50% in the illustrated embodiment. Above this value, valve 44 moves off its far right position and begins to modulate the pressure in line 110.

Throttle boost valve 45 has a spool 99, which includes a land 100, two adjacent narrower cylindrical portions 101 and 102, and another land 103. The right end of land 103 extends into a channel 104, which is open to sump. The narrowed portions 101 and 102 are received within stepped bores, in a channel 102a which communicates through line 105 with line 53, in which the boosted throttle pressure is provided. A cap 106 is provided in channel 107, which communicates through orifice 108 and channel 110 with a groove 113 of low throttle modulator valve 44. A spring 109 is received within a central bore of spool 99, so that the right end of this spring bears against the end surface of the bore and the left end abuts cap 106.

The throttle boost signal developed in valve 45 is passed through line 53 (1) to the left end of secondary sheave control valve 46, (2) to throttle valve 40, (3) to manual valve 47 (FIG. 1) to provide a regulated pressure for the forward clutch or reverse brake actuator, and (4) to lockup control valve 55. The use of the boosted throttle signal in connection with secondary sheave control valve 46 is important to the present invention, because it assists in providing a pressure in supply line 34 much lower than that found in prior art systems, but sufficiently high to maintain tension in the belt-and-pulley system of a level more than adequate to prevent belt slippage.

Secondary sheave control valve 46 includes a main spool 120, having a small diameter land 121 on the right end received within a bore 122 of the valve casing. Ratio signal pressure in line 67 is provided in the groove between lands 122 and 123, to exert a pressure on the spool which tends to move spool 120 to the left as the ratio between the primary and secondary pulleys increases from underdrive to overdrive. The groove portion 124 of the valve is within a central bore communicating with line 71 to provide fluid for lubricating purposes as already described. The adjacent land 125 of the valve regulates the amount of fluid from input line 32 which is "dumped" into line 71, to provide a regulated pressure of the fluid in supply line 34. A spring 129 encircles stem 131 and applies a bias force tending to move spool 120 to the right. An orifice 126 controls movement of fluid into the channel to the groove between lands 127 and 128, to minimize oscillation of this valve. Land 128 of the spool has a shoulder portion 130 with stem 131 at its left end. As shown, stem 131 abuts the right end of a smaller spool 132. Land 133 of spool 132 is contacted by stem 131. A groove 134 is defined between lands 133 and 135. Fluid received through line 53 from the throttle boost valve 45 is admitted into the chamber at the left end of spool 132, tending to displace this spool to the right and correspondingly displace spool 120 to the right, increasing the pressure in supply line 34. Fluid in line 57 representing the pitot pressure enters groove 134 of the spool, and acts to offset a part of the pressure developed by the throttle boost signal, to decrease the supply line pressure.

Belt Tension Subsystem: Operation

Considering the belt tension control subsystem in its operation, ratio valve 43 receives fluid in line 34 at the regulated supply line pressure. The ratio valve also receives a mechanical input signal, by the contact of sheave follower 42 with movable sheave 15 of the primary pulley. In the low ratio or start-up position, spool 72 is in the upper position as shown in FIG. 2. In this position the spring forces and spool positions are such as to develop a low fluid pressure, about 10 psi in an embodiment successfully tested, in line 67. Outer spring 69 is compressed in this position, and this force is added to the relatively small fluid pressure returned in line 67 and applied to the left end of land 73. This force, minus the light preload provided by inner spring 75, equals the desired net force acting on the sheave follower to cause it to remain in contact with movable sheave 15.

As the pulley ratio changes from low to the overdrive position, spool 72 moves to the position indicated in the lower portion of the drawing. The force of spring 69 bearing against spool 72 decreases as the spool moves to the right, but at the same time the rising pressure in line 67 is added at the left face of land 73, more than making up for the loss of spring force. In fact this results in a net force gain on the left end of spool 72. This gain is balanced by the increase in force developed as spring 75 is compressed. In a preferred embodiment the final pressure in line 67 was about 100 psi in the overdrive position, and a proportional increase in the ratio signal pressure was developed as the ratio of the transmission was changed. What is important to note is the force on sheave follower 42 is substantially constant over its movement, in that the increased compression in spring 75 is balanced by the resultant of the forces at the left end of spool 72 (increased ratio pressure minus the decreased force of spring 69). This valve and its operation represent a significant advance in the CVT art, because prior art arrangements use large sheave follower members which imposed a substantial load on the valve. The fluid ratio signal is passed to secondary sheave control valve 46, shift signal valve 64 and high throttle modulator valve 63.

Throttle valve 40 receives its source pressure through line 53 from throttle boost valve 45, and also responds to the torque demand (or throttle opening) signal as cam 70 is driven in response to an input from the vehicle driver. This results in a variable throttle signal in line 68. This pressure in line 68 starts at a low level, approximately 10 psi at zero throttle, and gradually increases at a rate which is a function both of the profile of cam 70 and the rate of spring 86. The pressure in line 68 reached approximately 100 psi at kickdown, when the accelerator pedal 37 is depressed by the driver. The pressure increase was accomplished as spring 86 was compressed by movement of spool 84 responsive to rotation of cam 70. The right end of spring 86 acts on spool 90 which functions as a standard type of modulator valve. Spring 95, plug 96, and adjusting screw 97 are provided to compensate for the manufacturing tolerances in the system.

When manual selector 48 (FIG. 1) is placed in the "manual low" position, manual valve 47 supplies fluid under pressure in line 54, which acts on the face of movable sleeve 89. Thus the "manual low" pressure in line 54 is effective to displace the movable sleeve 89 which in turn carries spool 84 to the right by a fixed distance, determined by the reduced bore diameter which limits the travel of sleeve 89. This provides a compression of spring 86 which acts on spool 90 to produce a throttle pressure signal in line 68, in the same manner as if the vehicle accelerator pedal had been depressed to a fixed position. This provides a shift schedule appropriate for manual low operation of the vehicle. Such operation can be overridden by the driver, by depressing the accelerator pedal beyond the point analogous to the pressure level supplied in line 54. Thus spool 84 cooperates with spool 90, translating the motion of cam 70 through spring 86, to produce a throttle signal in line 68.

This throttle signal in line 68 is passed to low throttle modulator valve 44, which controls the maximum value of the throttle pressure that will be passed to throttle boost valve 45. Spring 116 urges spool 111 to the right, so that land 112 opens line 68 through groove 113 to communicate with channel 110. This pressure is communicated through orifice 108 and channel 107 to the left side of spool 99. Line pressure from supply line 34 is received adjacent groove 102a, so as spool 99 is moved to the right, more fluid is passed through channel 105 to provide the boosted throttle signal line 53. With the illustrated design of low throttle modulator valve 44, the pressure in output channel 110 is the same as that in line 68, up to about 30 psi. In the embodiment built and tested, this corresponds to a carburetor opening of approximately 50%. When the throttle pressure signal in line 68 exceeds 30 psi, the pressure in channel 110 passed to the left side of throttle boost valve 45 remains at a constant 30 psi.

Throttle boost valve 45 in a sense is an amplifier, producing a boosted throttle pressure signal in line 53 which is directly proportional to the modulated throttle pressure in channel 107, applied to the left side of spool 99. The pressure in line 53 was approximately 70 psi with a signal in line 107 equal to 10 psi, where 10 psi represents zero throttle opening. When the pressure in line 107 went to 30 psi, representing a carburetor opening of 50% or greater, the boosted pressure in line 53 was 150 psi. This boosted throttle pressure in line 53 varies approximately in proportion to variations in the engine torque. Thus this pressure is passed to manual valve 47 (FIG. 1) to apply the transmission hydraulic friction elements (forward clutch, reverse brake, and through valve 55, lockup clutch 25). In addition to supplying the requisite pressure for the transmission friction elements, the boosted throttle signal is applied as one of the input signals to secondary sheave control valve 46.

The secondary sheave control valve receives two other signals, in addition to the boosted throttle signal. Pitot pressure is provided through line 57, and a ratio signal is provided by the pressure in line 67. In addition, valve 46 receives fluid from pump 31 through input line 32, and regulates the pressure in supply line 34 by exhausting excess oil to the various lubrication circuits represented by line 71. The pressure in supply line 34 is always applied to the secondary sheave chamber 30 and thus this pressure controls the torque capacity of the belt.

As the boosted throttle signal pressure in line 53 increases, this increase is applied to the left face of land 135. This forces spool 132 to the right, engaging stem 131 and moving the spool to the right. Thus land 125 and land 127 tend to block the spillage from input line 32 to channel 71, raising the pressure in supply line 34. This supplies the requisite pressure to hold the belt under high throttle conditions. This utilization of a throttle-conscious regulation is an important feature of the present invention because there is a corresponding reduction in the supply line pressure under low throttle conditions. For example, if a vehicle is inching through a supermarket parking lot at 5 mph, it does not require 500 psi to hold the belt from slipping in the pulleys. Nevertheless, prior art CVT control systems have generally maintained the high supply line pressure, notwithstanding the diminished requirements under such low speed or vehicle "inching" conditions.

The pitot signal pressure received in line 57 enters channel 134, and tends to offset a portion of the force developed by the boosted throttle signal. Hence the pressure in supply line 34 is reduced as the pitot pressure increases, as a function of an increasing primary sheave speed. This pitot pressure signal has very little effect at low speeds, and a moderate effect at high speeds, to assist in matching the supply line pressure to the engine torque curves. The third input signal to the secondary sheave control valve is the ratio pressure signal received through line 67 from the ratio valve. As the pulley ratio increases, the ratio signal pressure increases and acts on the right face of land 123 of spool 120. This urges spool 120 to the left, opening more of channel 124 to input line 32, thus reducing the pressure in supply line 34. The ratio signal in line 67 produces an appreciable effect on the pressure in supply line 34, approximating the actual force dropoff in the belt itself as the ratio changes from low to overdrive for a given input torque.

Ratio Control Subsystem: Structure

As noted previously, the purpose of ratio control subsystem 36 shown in FIG. 3 is to regulate the pressure of the fluid passed through channel 62 to primary sheave chamber 28. The primary sheave control valve 61 receives line pressure from supply line 34 and a pitot pressure signal from line 57. The ratio signal developed in valve 43 is supplied through line 67 to shift signal valve 64 and high throttle modulator valve 63. The same valves receive the throttle signal over line 68 from throttle valve 40 and cooperate to produce a shift signal in line 70.

In more detail, shift signal valve 64 includes a spool 141 with individual sections (from left to right) comprising a stem 142, a land 143, a groove 144, another land 145 which is smaller than 143, a groove 146, another land 147 of a diameter reduced with respect to the diameter of land 141, an extended groove 148, and a final land 150. A first spring 151 encircles stem 142, and is retained between valve stop 152 and the face of land 143. An adjusting plug 153 with a tapered nose 154 is positioned to the right of spool 141, and another spring 155 is retained between the face of land 150 and one end of plug 153. Adjustment of screw 156 is effective to change the position of plug 153 and correspondingly regulate the force spring 155 applies to the right end of the spool. Fluid under pressure corresponding to the ratio signal in line 67 is supplied into channel 144, between lands 143 and 141. The throttle signal pressure supplied in line 68 is supplied in groove 146, working on the area differential between lands 145 and 147. When spool 141 is moved to the left, throttle signal pressure is supplied through extended groove 148 to line 70 for passage to timing valve 65 and to the lockup control valve. Another signal is received by shift signal valve 64 through line 158 from high throttle modulator valve 63.

Valve 63 includes a spool 160, with portions including (from left to right) a first land 161, a groove 162, a second land 163, an extended groove 164, another land 165, and a stem 166 which terminates in a tapered nose portion 167. A plug 168 is positioned to slide within a sleeve 170, and plug 168 has a stem at each end, one of which abuts the tapered nose of stem 166. Adjusting screw 171 is threaded into a correspondingly tapped opening of end plate 172, so that adjustment of screw 171 changes the physical position of sleeve 170. This in turn regulates the force applied by a spring 173, positioned between sleeve 170 and one face of land 165. Other forces applied to spool 160 include throttle signal pressure in line 68, applied to one face of land 161, and also supplied to the area adjacent land 165. Ratio signal pressure is supplied at groove 162, to bear against a portion of the face of land 163. When spool 160 is displaced to the right, extended groove 164 communicates fluid from line 68 to line 158, as a "high throttle modulation" signal. This pressure is also passed through the opening defined by the end of sleeve 170 and the adjacent portion of wall 172, to bear on the right end of plug 168 and augment the force of spring 173.

Timing valve 65 includes a spool 180, bored to define a cylindrical portion in which a spring 181 is inserted. A valve stop 182 is inserted in the valve body and retained by a pin 183, to retain the left end of spring 181. Shift signal fluid pressure is supplied from line 170 and, through inlet 184, to groove 185 in the timing valve. In the starting position of valve 65, spool 180 is all the way to the right, communicating inlet 84 through groove 185 with outlet passage 186. An orifice 187 is provided between outlet 186 and line 188, which passes the shift signal pressure to the primary sheave control valve 61 and to accumulator valve 66. It will become evident that orifice 187 is very important for the operation of this invention, whereas the orifices 190 and 191 shown adjacent timing valve 65 are conventional arrangements used to reduce any tendency toward oscillation of the valve structure. Orifice 190 is positioned to communicate outlet 186 with the volume adjacent the face on the right end of spool 180. The other orifice 191 is positioned to pass fluid between channel 188 and the volume at the left end of spool 180, and into the hollowed out center of the spool. A check valve 192 including a ball 193 is positioned to block fluid flow from line 70 to channel 188, and is useful in back-off upshifts as will be explained hereinafter.

Primary sheave control valve 61 includes a spool 200, having a first land 201, an extended, centrally positioned groove 202, and a second land 203. Land 201 is hollowed out to define a central bore 204 in which a spring 205 is positioned. The left end of spring 205 bears against a valve stop 206, apertured to afford easy passage of the fluid under pressure from the chamber defined to the right of valve stop 206 into chamber 207, just to the right of accumulator valve 66. Control valve 61 has its other land 203 also bored out to define a central bore 208, and another spring 210 is positioned within this bore, bearing against the interior face of land 203 at its left, and at its right end abutting plug 211. Another adjusting screw 212 is provided to regulate the position of plug 211, thus regulating the initial bias force supplied by spring 210 against spool 200.

Accumulator valve 66 has a spool 215 hollowed out to define a bore 216 in which a spring 217 is positioned. A valve stop 218 is provided to retain the left end of spring 217. Fluid at the pressure in line 57, representing the pitot signal, is admitted through inlet 220 to the interior of spool 215, to add to the force developed by spring 217. This net force is opposed by the fluid pressure in channel 188, passed through the orifices in plate 206 into chamber 207 to the right of spool 215.

Ratio Control Subsystem: Operation

The shift signal valve 64 and high throttle modulator valve 63 cooperate to produce a pressure denoting the shift signal in line 70. The input information to these two valves is the ratio signal in line 67 and the throttle signal in line 68. The desired shift schedule calls for upshifts out of low ratio to be somewhat bunched together at light throttle starts, while at the heavier throttle starts, the upshifts will spread out rapidly into a more performance-oriented mode. This shift schedule is designed for better fuel economy. In addition, it is desirable that the shifting out of low be accompanied by an increasing engine speed at a light throttle setting; this allows for earlier starting of upshifting without lugging the engine as the ratio goes toward overdrive, and this aids fuel economy. In a mid-throttle start, ratio changing can occur at essentially constant speed. For heavier starts the assumed driver acceptance requires the engine speed should again increase with upshifting ratio changes.

To accomplish these various objectives, the shift signal valve modulates its source oil pressure, the throttle signal in line 68, to produce the shift signal pressure in line 70. After passage through timing valve 65, the shift signal will regulate primary sheave control valve 61. In light and medium throttle operation, the shift signal pressure signal is influenced by the ratio pressure. That is, throttle pressure in line 68 is passed upwardly into groove 146 of spool 141, developing a force against the face of land 145 which tends to move spool 141 to the left. This movement allows groove 148 to communicate more of the throttle signal fluid to line 70. The ratio signal pressure is received in groove 144 and acts on the area differential against the throttle signal pressure. These differential areas on which the ratio and throttle signal pressures act are selected so that light to medium throttle upshifts will generally be bunched somewhat together, with just sufficient ratio effect to properly control very light throttle upshifts along the desired curve. The ratio pressure change in line 67 is somewhat linear with the actual transmission ratio change, and in effect the ratio pressure signal is diminished as the shifting speed increases, because at the primary sheave control valve the pressure will be working against the pitot pressure which is a squared function.

The construction of high throttle modulator valve 63 is such that it does not become effective until a fairly high throttle opening, about 75%, is reached. Until this level is attained, the modulated throttle pressure in line 158 is at zero. The spring 173 in valve 63 is of sufficient force that it will maintain spool 160 forced to the left, thus exhausting the high modulated throttle pressure, until the combination of throttle pressure in line 68 and ratio pressure in line 67 is sufficiently high to overcome the force of spring 173. At this point the spool 160 is moved to the right and fluid from line 68 is passed through groove 164 and upwardly through line 158 to the right face of land 150 in the shift signal valve spool. Addition of this modulated pressure in line 158 to the force of spring 155 accomplishes two objectives. It spreads out the start of upshifting with increasing throttle pressure, and it adds a substantial effect of ratio pressure to the overall shift signal, thus producing the desired "top" end shift sequence.

Timing valve 65 and accumulator valve 66 cooperate in the control of demand type downshifts. When such a downshift is called for, oil must be exhausted from primary sheave chamber 28 at a rate sufficiently slow that the secondary sheave can keep tension on belt 18 as the secondary piston strokes. In other words, during downshifting, some oil must flow into secondary sheave chamber 30 as it strokes and this requires a certain volume of oil, which in turn requires a finite time to flow this volume of oil. If the primary sheave chamber 28 exhausts faster than secondary sheave chamber 30 can recover, the clamping force and thus the tension in the belt will be lost, causing the belt to slip.

To control the "rate of downshifting", the timing valve 65 and accumulator valve 66 cooperate to produce a slow, controlled buildup of shift signal pressure on primary sheave control valve 61, which in turn causes a slow exhausting of primary sheave chamber 28. When a demand type downshift is called for by depressing accelerator pedal 37, shift signal valve 64 raises the shift signal pressure in line 70 to a value commensurate with the desired engine speed. At this instant, both the timing valve and the accumulator valve are situated against their respective stops at the right ends of their bores. This permits the shift signal oil to commence feeding from line 70 into channel 184, through groove 185, out channel 186 and, through orifice 187 and channel 188, to primary sheave control valve 61 and to the right end of accumulator valve 66. This pressure causes the accumulator valve to begin to stroke to the left. As previously noted, orifice 187 is a crucial orifice; it allows the pressure in channel 188 to build up slowly as a small pressure drop is maintained across orifice 187. The full pressure in line 186 comes around through anti-hunt orifice 190, and is applied to the right face of spool 180. This pressure starts the timing valve spool to stroke to the left. When the pressure in chamber 207 at the right side of the accumulator valve reaches a value of approximately $2\frac{1}{2}$ psi greater than the existing pitot pressure applied through line 220 to the other face of the accumulator, spool 215 will no longer stroke. This $2\frac{1}{2}$ psi is the effect of the pre-load provided by accumulator spring 217. Also, as the forces of springs 205 and 210 are equal, this $2\frac{1}{2}$ psi urges spool 200 in the primary sheave control valve to move to the right of the mid position approximately 0.007 inch, thus starting a slow exhausting of primary sheave chamber 28.

The accumulator spool 215 continues to move to its left as the pressure in line 188 continues to increase. This accumulator spool movement creates an oil flow which must pass through orifice 187. This oil flow causes a pressure drop across orifice 187 and, when this drop reaches approximately 5 psi, timing valve 65 starts modulating. In other words the timing valve modulates the flow of the "shift signal" oil in line 70 through the timing valve to line 186, such that no matter how high the shift signal pressure in line 70, there will be a constant 5 psi drop across orifice 187.

The controlled flow and accumulation continues until the "timed shift signal" pressure in line 188 becomes equal to the original "shift signal" pressure in line 70. At this point, the pitot pressure has risen to within 3 to 5 psi of its final level as a result of the downward ratio change and the resulting increasing input speed. The accumulation action stops at this point and, as the final 3 to 5 psi pitot pressure is picked up, the accumulator valve spool 215 de-strokes, discharging its volume of oil back through the ball check valve 192 to line 70.

For upshifts, there is no requirement to "time" the shift. The accumulator valve will stroke when the accelerator is depressed but it will be de-stroked, through ball check 192, as pitot pressure rises and approaches the equilibrium condition. Thus when the ratio changing actually starts, the "shift signal pressure" in line 188 will be at its prescribed value.

In back-off types of upshifts, which require dropping pressure in line 188, the accumulator 215 will rapidly de-stroke, as necessary, through ball check valve 192.

I claim:

1. A control system for a continuously variable transmission having primary and secondary pulleys, each pulley having a first, axially fixed sheave and a second sheave axially movable relative to the first sheave, and a belt intercoupling the pulleys, which control system receives input signals from a throttle opening indicator and from a sheave follower which provides an indication of the position of one of the movable sheaves, which control system comprises a supply line, means for establishing fluid flow in the supply line, a secondary sheave control valve connected to regulate the line pressure supplied through the supply line to the secondary pulley movable sheave, and a primary sheave control valve, coupled between the supply line and the primary pulley movable sheave, for regulating the position of the primary pulley movable sheave and thus controlling the drive ratio between the pulleys, characterized in that a throttle valve is provided to develop a throttle pressure signal as a function of throttle opening, which throttle pressure signal is utilized to regulate the secondary sheave control valve in a sense to increase said line pressure as the throttle opening indicates an increased torque demand and to decrease said line pressure as the throttle opening indicates a reduced torque demand, thus providing a throttle-sensitive regulation of the fluid pressure in the supply line to the secondary pulley movable sheave, a ratio valve is provided to develop a ratio pressure signal as a function of the transmission ratio, the ratio valve including means for applying a combination of hydraulic and spring forces to produce a resultant force to urge the sheave follower against said one movable sheave, which resultant force is substantially constant throughout the stroke of the ratio valve, to develop a ratio pressure signal which is applied to the secondary sheave control valve in a sense to decrease said line pressure as the ratio pressure signal indicates a change in the transmission ratio in the direction from underdrive to overdrive, a shift signal valve connected to provide a shift signal pressure related to a desired engine speed, a timing valve coupled to the shift signal valve and having an outlet coupled to the primary sheave control valve, an accumulator coupled to one end of the primary sheave control valve, a channel communicating between the timing valve outlet and the common connection between the accumulator valve and the primary sheave control valve, and means defining an orifice positioned between said channel and the timing valve outlet, such that the rate of downshifting of the transmission is controlled as the timing valve and accumulator valve cooperate to provide a slow, controlled buildup of pressure on the primary sheave control valve to produce a corresponding slow exhaust of the primary sheave chamber.

2. A control system for a continuously variable transmission having primary and secondary pulleys, each having a fixed sheave and a movable sheave, and a belt intercoupling the pulleys, which control system comprises a supply line, means for establishing fluid flow in the supply line, and a secondary sheave control valve coupled to the supply line for regulating the line pressure supplied to the secondary pulley movable sheave, a throttle valve connected to develop a throttle pressure signal as a function of throttle opening, which throttle pressure signal is utilized to regulate the secondary sheave control valve in a sense to increase said line pressure as the throttle opening indicates an increased torque demand and to decrease said line pressure as the throttle opening indicates a reduced torque demand, thus providing a throttle-sensitive regulation of the fluid pressure in the supply line to the secondary pulley movable sheave, and further comprising a bore in which said throttle valve is positioned, a second spool positioned in the same bore, a spring positioned between the throttle valve and the second spool, a movable sleeve affixed to said second spool, and means, including a drive mode selector, for applying fluid under pressure to one end of said sleeve for displacing the second spool and compressing the spring, simulating a manual-low throttle position in the system.

3. A control system for a continuously variable transmission having primary and secondary pulleys, each having a fixed sheave and a movable sheave, and a belt intercoupling the pulleys, which control system comprises a supply line, means for establishing fluid flow in the supply line, and a secondary sheave control valve coupled to the supply line for regulating the line pressure supplied to the secondary pulley movable sheave, a throttle valve connected to develop a throttle pressure signal as a function of throttle opening, which throttle pressure signal is utilized to regulate the secondary sheave control valve in a sense to increase said line pressure as the throttle opening indicates an increased torque demand and to decrease said line pressure as the throttle opening indicates a reduced torque demand, thus providing a throttle-sensitive regulation of the fluid pressure in the supply line to the secondary pulley movable sheave, and a throttle boost valve, connected to the supply line as a pressure source, and coupled between the throttle valve and the secondary sheave control valve, which throttle boost valve utilizes the throttle pressure signal to provide the secondary sheave control valve with a boosted throttle pressure lower than the line pressure and varying as a function of the throttle pressure.

4. A control system as claimed in claim 3, said transmission also having hydraulically actuated friction elements, and means for utilizing the boosted throttle pressure in the actuation of said friction elements.

5. A control system as claimed in claim 3, in which additional means is provided for sensing the speed of the primary pulley and the drive ratio between the pulleys, said secondary sheave control valve being coupled to said additional means and regulated to increase the line pressure as the boosted throttle pressure is increased, to decrease the line pressure as the speed of the primary pulley increases, and to decrease the line pressure as the drive ratio between the pulleys changes from underdrive toward overdrive.

6. A control system for a continuously variable transmission having primary and secondary pulleys, each having a fixed sheave and a movable sheave, and a belt intercoupling the pulleys, which control system comprises a supply line, means for establishing fluid flow in the supply line, a secondary sheave control valve coupled to the supply line for regulating the line pressure supplied to the secondary pulley movable sheave, and a sheave follower for providing an indication of the position of one of said movable sheaves, characterized in that a ratio valve is provided to develop a ratio pressure signal as a function of the transmission ratio, the ratio valve including means for applying a combination of hydraulic and spring forces to produce a resultant force to urge the sheave follower against said one movable sheave, which resultant force is substantially constant throughout the stroke of the ratio valve, to develop a ratio pressure signal which is applied to the secondary sheave control valve in a sense to decrease said line pressure as the ratio pressure signal indicates a change in the transmission ratio in the direction from underdrive to overdrive.

7. A control system as claimed in claim 6, in which the ratio valve and means for applying the hydraulic and spring forces includes a bore, first and second channels communicating with said bore, means for applying fluid at line pressure to the first channel, a regulating spool positioned in said bore to control fluid passage from the first channel to the second channel and thus provide the ratio pressure signal in the second channel, a second spool positioned in the bore and having first and second end portions, a first spring disposed between the regulating spool and the first end of the second spool, a second spring disposed between the second end of the second spool and an end wall of the bore, a channel for communicating the ratio pressure signal to the second end of the second spool to augment the force of the second spring, and means, including the sheave follower, for displacing the second spool as a function of movement of said one movable sheave, such that the net force change provided on the second end of the second spool, from the combination of the ratio pressure signal and the second spring, is substantially balanced at the first end of the second spool by the net force change of the first spring.

8. A control system for a continuously variable transmission having primary and secondary pulleys, each pulley having a fixed sheave and a movable sheave, and a belt intercoupling the pulleys, which control system comprises a supply line, means for establishing fluid flow in the supply line, a primary sheave control valve, coupled between the supply line and the primary pulley movable sheave, for regulating the position of the primary pulley movable sheave and thus controlling the drive ratio between the pulleys, and a shift signal valve connected to provide a shift signal pressure related to a desired engine speed, characterized in that a timing valve has an inlet coupled to the shift signal valve and an outlet, an accumulator coupled to one end of the primary sheave control valve, a channel communicating between the timing valve outlet and the common connection between the accumulator valve and the primary sheave control valve, and means defining an orifice positioned between said channel and the timing valve outlet, such that the rate of downshifting of the transmission is controlled as the timing valve and accumulator valve cooperate to provide a slow, controlled buildup of pressure on the primary sheave control valve to produce a corresponding slow exhaust of the primary sheave chamber.

9. A control system as claimed in claim 8, and further comprising means for sensing pitot pressure and applying a signal related to pitot pressure to the end of the accumulator valve opposite the end coupled to said channel, and a ball check valve, coupled between said channel and the timing valve inlet, allowing the accumulator valve to be de-stroked as pitot pressure rises and the system approaches equilibrium, and further allowing rapid de-stroking of the accumulator valve during back-off upshifts.

* * * * *